(12) United States Patent
Nitto

(10) Patent No.: US 9,362,850 B2
(45) Date of Patent: Jun. 7, 2016

(54) VIBRATION TYPE DRIVING APPARATUS AND DRIVING CIRCUIT THEREOF

(71) Applicant: CANON KABUSHIKI KAISHA, Tokyo (JP)

(72) Inventor: Kiyoshi Nitto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 13/851,478

(22) Filed: Mar. 27, 2013

(65) Prior Publication Data

US 2013/0257225 A1   Oct. 3, 2013

(30) Foreign Application Priority Data

Apr. 2, 2012  (JP) ................. 2012-084292

(51) Int. Cl.
  *H02N 2/00*  (2006.01)
  *H02N 2/10*  (2006.01)

(52) U.S. Cl.
  CPC ............... *H02N 2/001* (2013.01); *H02N 2/106* (2013.01)

(58) Field of Classification Search
  CPC .............................. H02N 2/001; H02N 2/106
  USPC ................................. 310/323.02, 328, 323.12
  IPC ........................................................ H02N 2/00
  See application file for complete search history.

(56) References Cited

U.S. PATENT DOCUMENTS

| | | | |
|---|---|---|---|
| 5,436,522 A | 7/1995 | Tsukimoto et al. | |
| 6,888,288 B2 | 5/2005 | Seki et al. | |
| 6,930,436 B2 * | 8/2005 | Tsukimoto et al. | ...... 310/323.02 |
| 6,989,624 B2 * | 1/2006 | Tsukimoto et al. | ...... 310/323.12 |
| 7,301,259 B2 * | 11/2007 | Maruyama et al. | ...... 310/323.11 |
| 7,608,982 B2 * | 10/2009 | Nitto et al. | ............... 310/323.12 |
| 2002/0096971 A1 * | 7/2002 | Tsukimoto | ............... 310/323.03 |

FOREIGN PATENT DOCUMENTS

| | | |
|---|---|---|
| JP | 4-91671 A | 3/1992 |
| JP | 2002-291265 A | 10/2002 |
| JP | 3416233 B2 | 6/2003 |

OTHER PUBLICATIONS

Office Action issued in Japanese Patent Application No. 2012-084292, dated Feb. 23, 2016.

* cited by examiner

*Primary Examiner* — Thomas Dougherty
*Assistant Examiner* — Karen B Addison
(74) *Attorney, Agent, or Firm* — Fitzpatrick, Cella, Harper & Scinto

(57) ABSTRACT

A vibration type driving apparatus includes a vibrating body having an electrical-mechanical energy converting element, a first elastic body and a second elastic body; and a moving body that moves relative to the vibrating body. The vibrating body has a third elastic body that includes a sliding surface. A resonance frequency in a mode where the non-sliding surface side of the vibrating body in the axial direction mainly vibrates with the third elastic body is adapted so as to fall out of a frequency range between a multiple of a maximum frequency of a driving signal applied to the electrical-mechanical energy converting element, and a multiple of a minimum frequency of the driving signal.

12 Claims, 3 Drawing Sheets

VIBRATION TYPE DRIVING APPARATUS AND DRIVING CIRCUIT THEREOF

BACKGROUND OF THE INVENTION

1. Field of the Invention

The present invention relates to a vibration type driving apparatus and a driving circuit of the vibration type driving apparatus, and particularly, relates to a so-called ultrasonic motor in which an elliptic motion is formed on the surface of a vibrating body by an electrical-mechanical energy converting element to perform a relative movement between the vibrating body and a moving body, which is used for lenses for cameras, office automation (OA) equipment, or the like, and a driving circuit of the ultrasonic motor.

2. Description of the Related Art

Nowadays, vibration type actuators (vibration type driving apparatuses) that vibrate a vibrating body using a distortion generating element that generates mechanical distortion as an electric field or a magnetic field is exerted, and convert the vibration of the vibrating body into a continuous or intermittent mechanical motion and output the motion are used in various fields.

An actuator referred to as an ultrasonic motor among piezoelectric actuators utilizing a piezoelectric element is able to constitute a rotary drive source of continuous rotation type.

Because of this, this rotation drive source has already been mounted on optical instruments, such as a camera, as a drive source that replaces a rotary electromagnetic drive motor of the related art, and the driving control technique of such an ultrasonic motor has also been substantially established.

Although the technique regarding the ultrasonic motor has been substantially established, the technique of stabilizing efficiency requires further improvements.

Vibration type driving apparatuses (ultrasonic motors) that excite the vibration of equiform bending modes within a plurality of different planes are disclosed in, for example, Japanese Patent Application Laid-Open No. H04-091671 and the like, and the driving principle or the like thereof is described in detail in these publications.

Vibrating bodies disclosed in these publications include an electrical-mechanical energy converting element and an elastic member.

The vibrating body sandwiches and fixes the electrical-mechanical energy converting element with the elastic member from both sides.

Driving of the vibration type driving apparatuses that excites the vibration of such equiform bending modes within the plurality of different planes is allowed by generating an elliptic motion on surface particles of the vibrating body and continuously driving a moving body that is brought into pressurized contact with this vibrating body.

Pattern electrodes are formed on the piezoelectric element, and substantially sinusoidal alternating voltages that are sequentially different in time phases by 90° are applied to the respective electrodes.

If alternating voltages are applied in a frequency near the natural vibration of a vibration mode to be excited, the vibrating body resonates due to a bending moment applied to the vibrating body by the expansion and contraction of the piezoelectric element.

The vibration modes that are respectively excited with respect to the alternating voltages that are different by 90° are equiform and are different in phase, and an elliptic motion is formed on the surface particles of the vibrating body by the synthesis of the modes.

SUMMARY OF THE INVENTION

However, in the vibration type driving apparatuses that excite the vibration of the equiform bending modes of the above related-art within the plurality of different planes, and use the bending modes by shifting and superposing positional phases by 90°, there are the following problems because of the superposition of the equiform bending modes.

Particularly, in a case where the vibrating body has a plurality of natural vibration modes in which displacement directions and orders in the vibration body are the same and relative proportions in which both respective end portions in the vibrating body are displaced are different, excitation is apt to occur simultaneously because the plurality of natural vibration modes are alike.

In addition to higher-order vibration modes of a natural frequency as a driving frequency, particularly, an exciting force that has a frequency twice larger than the driving frequency is always imparted from the vibrating body to the moving body. Therefore, the vibration mode with the frequency which is twice the natural frequency is easily excited in the vibrating body due to the reaction force of the exciting force.

In order to describe these in more detail, a vibrating body apparatus illustrated in FIG. 3 will be taken as an example and described. As illustrated in (a) and (b) of FIG. 3, this vibrating body apparatus includes a vibrating body 101 in which an electrical-mechanical energy converting element 103 is provided between a first elastic body 101A and a second elastic body 101B via a third elastic body 101C arranged on first elastic body side.

Additionally, this vibrating body apparatus includes a moving body that comes into contact with the vibrating body 101 and moves relative to the vibrating body 101 by a progressive wave excited to the vibrating body 101 by applying a driving signal to the electrical-mechanical energy converting element 103.

(c) and (d) of FIG. 3 are views illustrating bending vibration modes (a z-axis is an axial direction and an r-axis is a radial direction) of this vibrating body 101.

If only vibration in a mode where axial sliding surface side including the first elastic body in the vibrating body mainly vibrates with the third elastic body illustrated in (c) of FIG. 3 as a border is excited while a motor is driving, it is possible to efficiently drive the motor.

In that case, if vibration in a mode where the axial non-sliding-surface side including the second elastic body in the vibrating body mainly vibrates with the third elastic body illustrated in (d) of FIG. 3 as a border is excited, strain of the electrical-mechanical energy converting element become large. Therefore, this becomes a cause of degradation of the motor.

The invention provides a vibration type driving apparatus capable of suppressing excitation in a mode where the axial non-sliding-surface side in a vibrating body mainly vibrates with a third elastic body as a border, and capable of performing driving while stabilizing efficiency when driving the vibrating body having an electrical-mechanical energy converting element provided via the third elastic body arranged on the first elastic body side between a first elastic body and a second elastic body, and driving circuit thereof.

A vibration type driving apparatus of one aspect of the invention relates to a vibration type driving apparatus including a vibrating body in which an electrical-mechanical energy converting element is provided between a first elastic body and a second elastic body; and a moving body that comes into contact with the vibrating body and moves relative to the vibrating body. The vibrating body has a third elastic body between the first elastic body and the electrical-mechanical energy converting element. The third elastic body that extends in a direction perpendicular to an axial direction of the vibrating body and includes a sliding surface outside than the external diameter of the electrical-mechanical energy converting element, the moving body slides on the sliding surface. The vibrating body has a plurality of natural vibration modes in which displacement directions and orders are the same and relative proportions of displacements at end portions of the vibrating body in an axial direction are different. A resonance frequency in a mode where the non-sliding surface side of the vibrating body in the axial direction mainly vibrates with the third elastic body as a border is adapted so as to fall out of the frequency range between a multiple number of a maximum frequency of a driving signal applied to the electrical-mechanical energy converting element, and a multiple number of a minimum frequency of the driving signal.

Additionally, a driving circuit of a vibration type driving apparatus of one aspect of the invention relates to a driving circuit of a vibration type driving apparatus including a vibrating body in which an electrical-mechanical energy converting element is provided between a first elastic body and a second elastic body; and a moving body that moves relative to the vibrating body. The vibrating body includes a third elastic body between the first elastic body and the electrical-mechanical energy converting element. The third elastic body extends in a direction perpendicular to an axial direction of the vibrating body and includes a sliding surface outside than the external diameter of the electrical-mechanical energy converting element, the moving body slides on the sliding surface. The vibrating body applies a driving signal to the vibration type driving apparatus having a plurality of natural vibration modes in which displacement directions and orders are the same and relative proportions of displacements at portions of the vibrating body in an axial direction are different. A frequency range between a multiple number of a maximum frequency of the driving signal and a multiple number of a minimum frequency of the driving signal falls out of a resonance frequency in a mode where the non-sliding surface side of the vibrating body in the axial direction mainly vibrates with the third elastic body as a border.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

As Embodiment 1, a structure example of a vibration type driving apparatus that causes an elliptic motion in a frictional driving part of a vibrating body and relatively moves a moving body that comes into contact with the frictional driving part of the vibrating body will be described.

First, an example of the structure of a vibration type motor 100 will be described with reference to (a) of FIG. 3.

Figure 3:
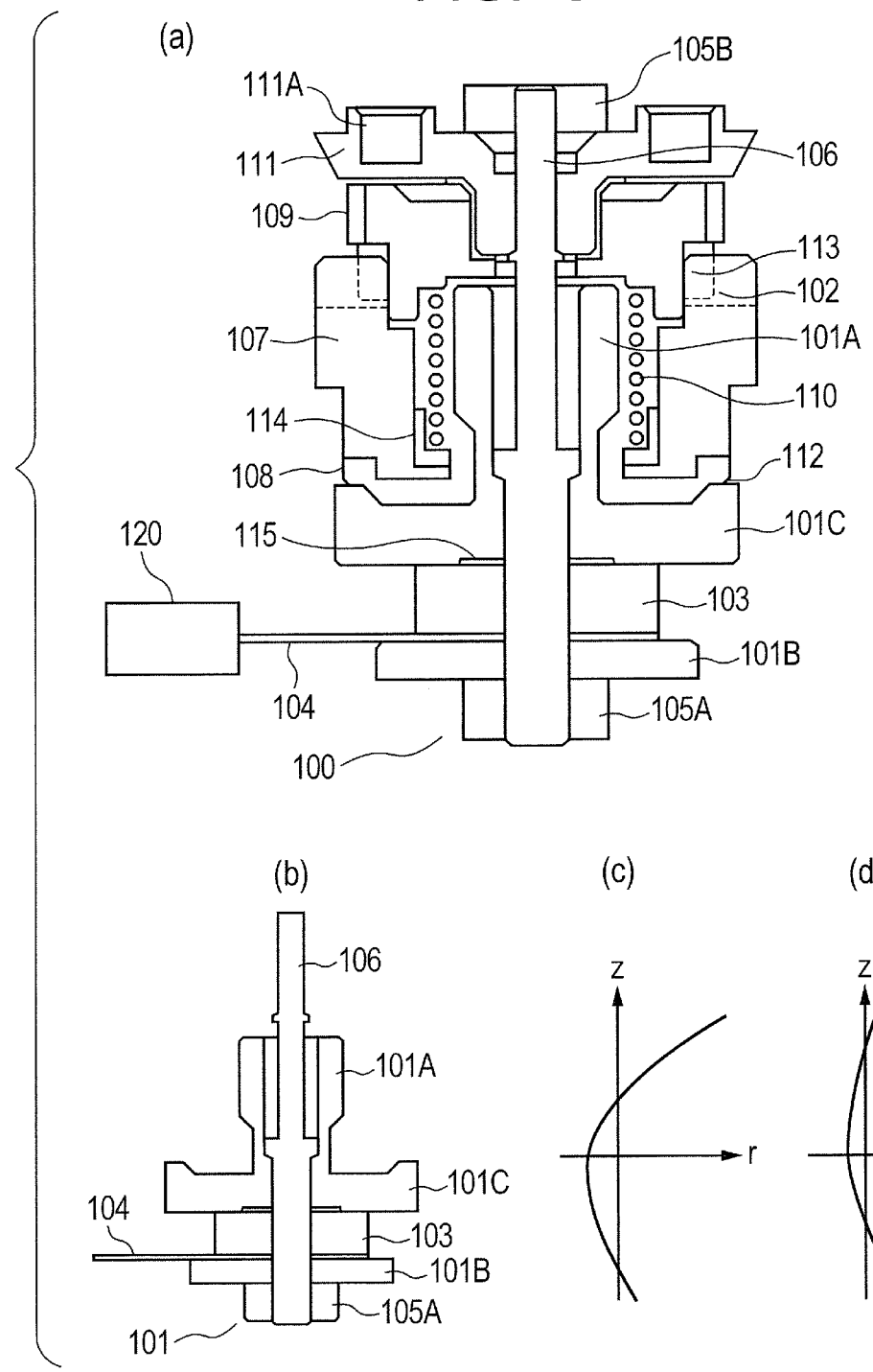
FIG. 3 illustrates a structure of the vibration type driving apparatus.

In (a) of FIG. 3, a vibration type driving apparatus 100 (vibration type motor) is provided.

The vibration type driving apparatus of the present embodiment includes a vibrating body in which an electrical-mechanical energy converting element is provided between a first elastic body and a second elastic body via a third elastic body arranged on the first elastic body side. That is, the vibrating body has the third elastic body between the first elastic body and the electrical-mechanical energy converting element. The vibrating body of the present embodiment is adapted to have a plurality of natural vibration modes in which displacement directions and orders are the same and relative proportions in which both end portions of the vibrating body in an axial direction are displaced are different. In that case, the vibrating body is able to be adapted so as to supply a driving signal, which is a mode in which the axial sliding surface side in the vibrating body mainly vibrates with the third elastic body as a border among the plurality of different vibration modes, from the driving circuit to the electrical-mechanical energy converting element.

Additionally, the third elastic body of the present embodiment includes a sliding surface that extends in a direction orthogonal to the axial direction of the vibrating body and on which the moving body slides further toward the outside than the external diameter of the electrical-mechanical energy converting element.

The vibration type driving apparatus includes a moving body that comes into contact with the vibrating body, and is moved relative to the vibrating body by a progressive wave excited in the vibrating body by applying a driving signal to the electrical-mechanical energy converting element.

Specifically, the vibration type driving apparatus includes the first elastic body 101A made of materials having small vibration damping loss, such as metal, the third elastic body 101c and a piezoelectric element 103 that is the electrical-mechanical energy converting element.

Figure 4:
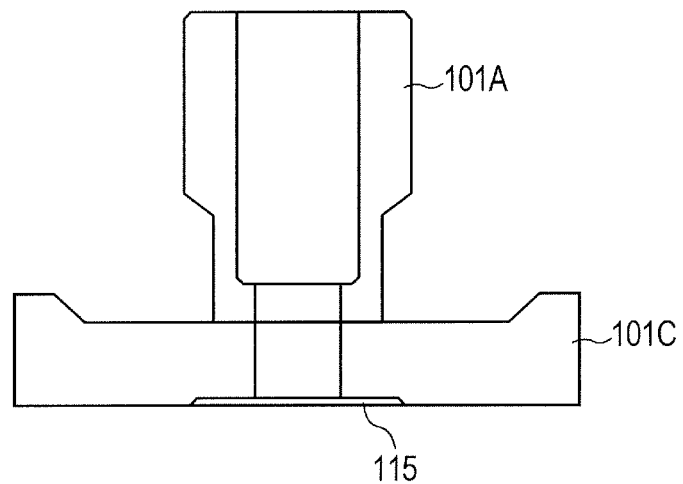
FIG. 4 illustrates another structure of the vibration type driving apparatus.

Additionally, although the first elastic body 101A and the third elastic body 101C of (a) of FIG. 3 are integrally processed, as illustrated in FIG. 4, the first elastic body 101A and the third elastic body 101C may be constituted by two parts.

The vibration type driving apparatus also includes a flexible substrate 104 for applying an alternating signal to the piezoelectric element 103 as a driving signal from a driving circuit 120, the second elastic body 101B and a first tightening member 105A that fits to a threaded portion formed at a lower end of a shaft 106.

The shaft 106 is inserted into through holes provided at central portions of the first elastic body 101A, the third elastic body 101C, the piezoelectric element 103, the flexible substrate 104 and the second elastic body 101B.

A step is provided in the middle of the shaft 106, and this step contacts a step provided in an inner wall of the first elastic body 101A.

A thread is formed at the tip (lower end) portion of the shaft 106, and the first tightening member 105A that is a fastening member is fitted and tightened to the thread. Thereby, the second elastic body 101B, the flexible substrate 104, the piezoelectric element 103, the third elastic body 101C and the first elastic body 101A are able to be fixed.

A recess 115 is provided on the side of the third elastic body 101C that comes into contact with the piezoelectric element 103 so that both come into contact with each other at an outer periphery of the piezoelectric element 103.

A contact spring 108 fixed to a rotor 107 that is a moving body 102 is brought into pressurized contact with the surface of a frictional driving part 112 on the side of the third elastic body 101C that does not come into contact with the piezoelectric element 103.

The contact spring 108 has elasticity, is fixed to the rotor 107, and integrally rotates.

The vibration type driving apparatus includes a gear 109 that is an output unit that permits the movement of a rotor 107 in the direction of a rotational axis, and fits to the rotor 107 and two racing stoppers 113 so as to follow the rotational motion of the rotor 107.

The vibration type driving apparatus also includes a pressurizing unit 110, such as a coil spring, which is arranged between a spring receiving portion of the rotor 107, and the gear 109 to pressurize the rotor 107 so as to depress the rotor in the direction of the third elastic body 101C.

The vibration type driving apparatus also includes an elastic rubber 114 that is made of polymeric materials or the like. This elastic rubber serves as pressurize equalizing, unnecessary vibration suppressing, or the like. The gear 109 is journalled to a fixing member 111 combined with the shaft 106, and the position thereof in the axial direction is regulated by the fixing member 111.

A thread is also formed at a tip (upper end) portion of the shaft 106 that does not fit to the first tightening member 105A, and a second fastening member 105B is made to fit this thread so as to fix the shaft 106 to the fixing member 111.

The fixing member 111 is provided with a thread hole 111A, and the vibration type motor is able to be attached to a desired location by fixing the fixing member 111 to the desired location using a thread.

As for the piezoelectric element 103, for example, as described in Japanese Patent No. 3,416,233, electrode layers are formed on both surfaces of one piezoelectric body, an electrode layer on one surface is divided into four electrode layers, and A(+), A(−), B(+), and B(−) phases are formed.

In four regions where the electrode layers are formed, polarization is made in the thickness direction of the piezoelectric element 103 so that A(+) and A(−), and B(+) and B(−) are reverse to each other, respectively, and the four regions include two groups of A phase and B phase.

If a driving signal is applied to electrodes of this one group, one region of the piezoelectric element 103 expands in the thickness direction, and the other region contracts in the thickness direction.

Additionally, a driving signal whose phase is shifted by 90° in time is applied to the piezoelectric body of the other group. Then, two bending vibrations (one bending vibration is generated such that the amplitude direction thereof is a direction perpendicular to the axial direction of the shaft 106, and the other bending vibration is generated such that the amplitude direction thereof is a direction whose phase is shifted by 90° from one direction) that swings the first elastic body 101A to the right and to the left are generated on the vibrating body.

If these vibrations are synthesized, an elliptic motion is formed in the frictional driving part 112 of the surface of the third elastic body 101C.

If the contact spring 108 is brought into pressurized contact with the frictional driving part 112 of the surface of the third elastic body 101C in which this elliptic motion is excited, the contact spring 108 and the rotor 107 (moving body) move so as to be pushed out by this elliptic motion.

Hereinafter, the relationship between the vibration type driving apparatus in the present embodiment and the frequency of a driving signal to be applied will be described with reference to FIG. 1.

Figure 1:
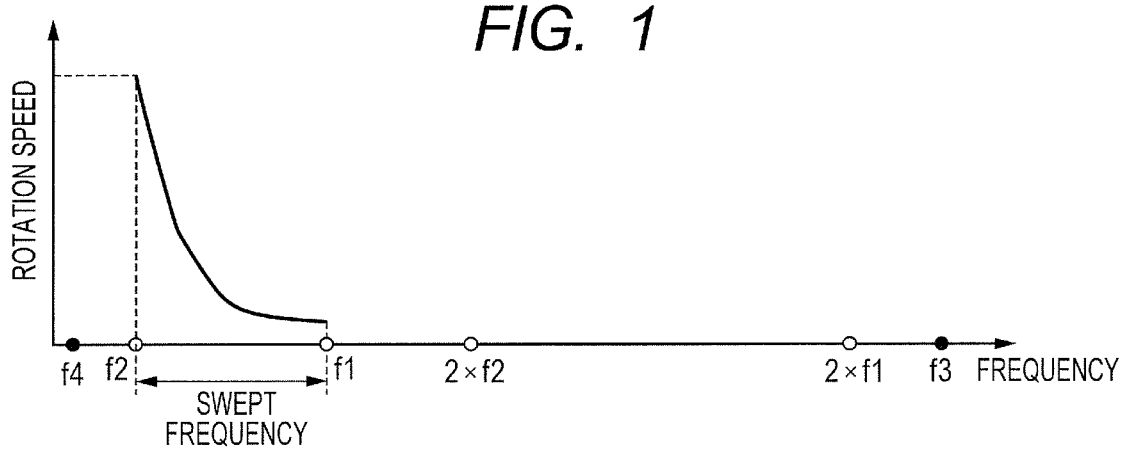
FIG. 1 illustrates a relationship of frequency in a vibration type driving apparatus.

FIG. 1 illustrates the relationship between the frequency of a driving signal to be applied to the vibration type driving apparatus in the present embodiment, and a resonance frequency f3 in a mode where the axial non-sliding-surface side (103, 101B, 105A) in the vibrating body mainly vibrates with the third elastic body 101C as a border. The horizontal axis of FIG. 1 represents frequency and the vertical axis represents rotation speed.

Additionally, f4 represents a resonance frequency in a mode where the axial sliding surface side (101A) in the vibrating body mainly vibrates with the third elastic body 101C as a border.

Here, the driving signal vibrates the vibrating body by starting sweeping from a swept maximum frequency f1 and performing sweeping to a swept minimum frequency f2 that reaches an arbitrary speed. A resonance frequency in a mode where the vibrating body on the axial non-sliding surface side mainly vibrates with the third elastic body as a border is adapted so as to fall out of the range of the value of a multiple number of a driving frequency range where sweeping is performed.

Specifically, the frequency range between the two-fold value of the swept maximum frequency f1 and the two-fold value of the swept minimum frequency f2 is made smaller (lower) than the value of the resonance frequency f3 in the mode where the vibrating body on the axial non-sliding surface side (103, 101B, 105A) mainly vibrates with the third elastic body 101C as a border. During frequency sweeping, by establishing such relationship, it is possible to suppress the excitation in the mode where the axial non-sliding-surface side (103, 101B, 105A) in the vibrating body mainly vibrates with the third elastic body 101C as a border, and it is possible to result in stabilization of efficiency.

Embodiment 2

As Embodiment 2, a structure example in a form different from Embodiment 1 will be described with reference to FIG. 2.

Figure 2:
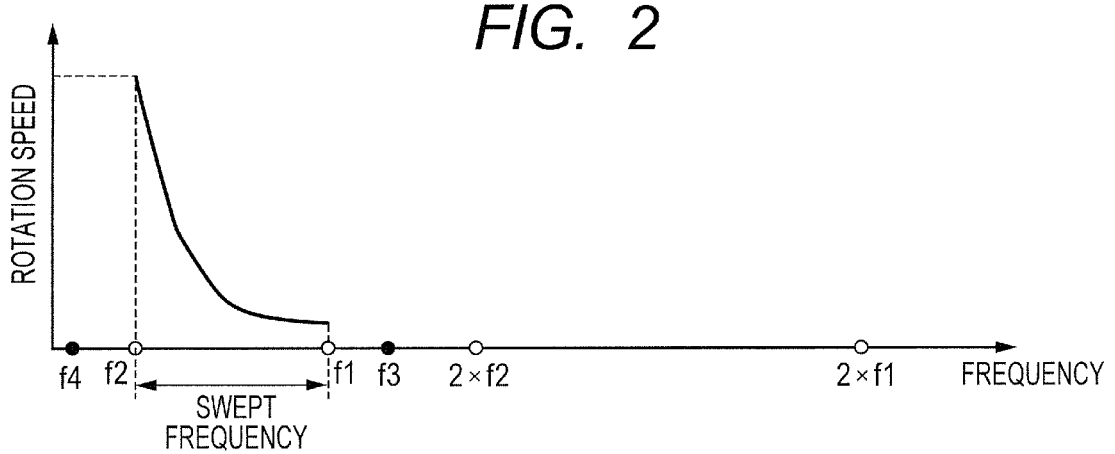
FIG. 2 illustrates a relationship of the frequency in the vibration type driving apparatus.

The relationship between a frequency to be swept in the vibration type driving apparatus, and a resonance frequency in the mode where the vibrating body on the axial non-sliding surface side (103, 101B, 105A) mainly vibrates with the third elastic body 101C as a border is illustrated in FIG. 2.

The horizontal axis of FIG. 2 represents frequency and the vertical axis represents rotation speed.

Here, the driving signal vibrates the vibrating body by starting sweeping from a swept maximum frequency f1 and performing sweeping to a swept minimum frequency f2 that reaches an arbitrary speed. Additionally, similarly to Embodiment 1, a resonance frequency in a mode where the vibrating body on the axial non-sliding surface side mainly vibrates with the third elastic body as a border is adapted so as to fall out of the range of the value of a multiple number of a driving frequency range to be swept.

Specifically, the frequency range between the two-fold value of the swept maximum frequency f1 and the two-fold value of the swept minimum frequency f2 is made greater (higher) than the value of the resonance frequency f3 in the mode where the vibrating body on the axial non-sliding surface side (103, 101B, 105A) mainly vibrates with the third elastic body 101C as a border.

By establishing such relationship, it is possible to suppress the excitation in the mode where the vibrating body on the axial non-sliding-surface side (103, 101B, 105A) mainly vibrates with the third elastic body 101C as a border, and it is possible to result in stabilization of efficiency.

However, the following results are confirmed by experiments of the present inventors regarding the vibration type driving apparatus after assembling.

That is, it is confirmed that the frequency increasing amount of the resonance frequency f3 in the mode where the vibrating body on the axial non-sliding surface side (103, 101B, 105A) mainly vibrates with the third elastic body 101C as a border is about 50 times greater than that of the resonance frequency f4 in the mode where the vibrating body on the axial sliding surface side (101A) mainly vibrates.

For this reason, in order to make the frequency range between the two-fold value of the swept maximum frequency f1 and the two-fold value of the swept minimum frequency f2 greater than the value of the resonance frequency f3 in the mode where the vibrating body on the axial non-sliding surface side (103, 101B, 105A) mainly vibrates with the third elastic body 101C as a border, it is necessary to perform setting by anticipating changes in the frequency range, and the degree of freedom in setting becomes low as compared to Embodiment 1.

Figure 5:
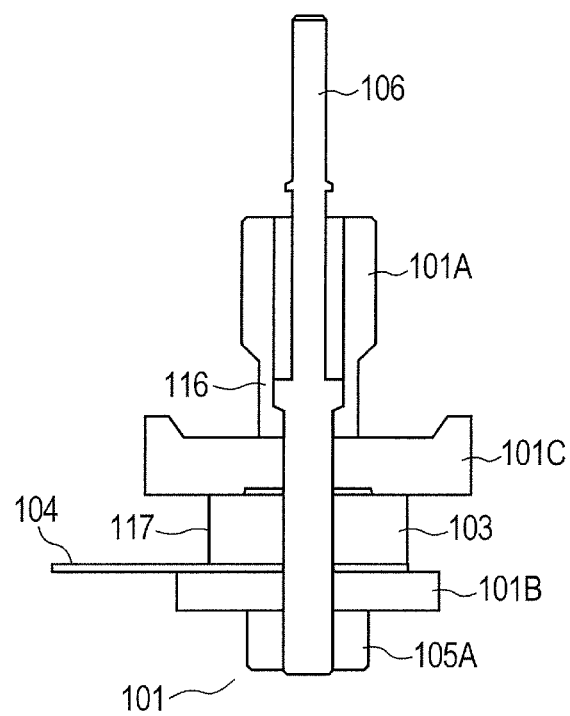
FIG. 5 illustrates a structure of a vibrating body.

Additionally, in order to establish the relationship between frequencies as in Embodiment 1 and Embodiment 2, the dynamic rigidity of the vibrating body is changed by adjusting the diameter dimensions in constriction portions 116 and 117 illustrated in FIG. 5 with respect to the frequencies of the resonance frequency f3 and the resonance frequency f4.

That is, the resonance frequency f3 in the mode where the axial non-sliding-surface side (103, 101B, 105A) in the vibrating body mainly vibrates with the third elastic body 101C as a border, and the frequency of the resonance frequency f4 in the mode where the sliding-surface side (101A) in the vibrating body mainly vibrates are adjusted as illustrated in FIG. 5.

It is possible to make the dynamic rigidity on the axial sliding surface side in the vibrating body smaller than the dynamic rigidity on the axial non-sliding surface side in the vibrating body, thereby adjusting the above resonance frequencies f3 and f4.

Although both the resonance frequency f3 and the resonance frequency f4 are changed by changing dynamic rigidity by the adjustment of the diameter dimensions, it is possible to establish the relationship of frequencies as in Embodiment 1 and Embodiment 2 because the changing rates of the resonance frequencies are different from each other.

In order to change the dynamic rigidity, it is also possible to change shapes, such as length, or materials. Therefore, the invention is not limited to the structures of the above embodiments, and a structure capable of satisfying the relationship between frequencies may be provided.

In addition, in the structure of the above embodiments, the vibrating body is made stationary, and the rotor as the moving body that is brought into pressurized contact with the vibrating body is made movable. However, the invention is not limited to this.

For example, the moving body may be made stationary and the vibrating body may be made movable, and a structure in which the moving body is relatively and frictionally driven by driving vibration formed in the third elastic body of the vibrating body that protrudes in the shape of a flange may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-084292, filed Apr. 2, 2012, hereby incorporated by reference herein in its entirety.

What is claimed is:

1. A vibration type driving apparatus comprising:
   a vibrating body in which an electrical-mechanical energy converting element is provided between a first elastic body and a second elastic body; and
   a moving body that comes into contact with the vibrating body and moves relative to the vibrating body,
   wherein the vibrating body has a third elastic body between the first elastic body and the electrical-mechanical energy converting element,
   wherein the third elastic body extends in a direction perpendicular to an axial direction of the vibrating body and includes a sliding surface further outside than the external diameter of the electrical-mechanical energy converting element, and the moving body slides on the sliding surface,
   wherein the vibrating body has a plurality of natural vibration modes in which displacement directions and orders are the same and relative proportions of displacements at end portions of the vibrating body in an axial direction are different, and
   wherein a resonance frequency in a mode where the non-sliding surface side of the vibrating body in the axial direction mainly vibrates with the third elastic body as a border is configured to fall out of a frequency range between a multiple of a maximum frequency of a driving signal applied to the electrical-mechanical energy converting element, and a multiple of a minimum frequency of the driving signal.

2. The vibration type driving apparatus according to claim 1,
   wherein the dynamic rigidity on a sliding surface side of the vibrating body is smaller than a dynamic rigidity on the non-sliding surface side of the vibrating body in the axial direction with the third elastic body as a border.

3. The vibration type driving apparatus according to claim 1,
   wherein the resonance frequency in the mode where the non-sliding surface side of the vibrating body mainly vibrates is greater than a value within the frequency range between the multiple of the maximum frequency to be swept in the vibration type driving apparatus and the multiple of the minimum frequency to be swept in the vibration type driving apparatus.

4. The vibration type driving apparatus according to claim 1,
   wherein the multiple is two times.

5. The vibration type driving apparatus according to claim 1, further comprising a driving circuit that supplies a driving signal to the electrical-mechanical energy converting element,
   wherein a mode where the sliding surface side of the vibrating body mainly vibrates is excited among the plurality of different vibration modes by the driving signal.

6. The vibration type driving apparatus according to claim 1,
   wherein the third elastic body is formed by integral processing with the first elastic body.

7. The vibration type driving apparatus according to claim 1,
   wherein the second elastic body is provided on the non-sliding-surface side with respect to the third elastic body.

8. The vibration type driving apparatus according to claim 1, wherein the resonance frequency in the mode where the non-sliding surface side of the vibrating body mainly vibrates with the third elastic body as a border is higher than a value within the frequency range between the multiple of the maximum frequency of the driving signal and the multiple of the minimum frequency of the driving signal.

9. The vibration type driving apparatus according to claim 1,
wherein the resonance frequency in the mode where the non-sliding surface side of the vibrating body mainly vibrates with the third elastic body as a border is lower than a value within the frequency range between the multiple of the maximum frequency of the driving signal and the multiple of the minimum frequency of the driving signal.

10. A driving circuit of a vibration type driving apparatus comprising:
a vibrating body in which an electrical-mechanical energy converting element is provided between a first elastic body and a second elastic body; and
a moving body that moves relative to the vibrating body,
wherein the vibrating body includes a third elastic body between the first elastic body and the electrical-mechanical energy converting element,
wherein the third elastic body extends in a direction perpendicular to an axial direction of the vibrating body and includes a sliding surface further outside than the external diameter of the electrical-mechanical energy converting element, and the moving body slides on the sliding surface,
wherein the vibrating body applies a driving signal to the vibration type driving apparatus having a plurality of natural vibration modes in which displacement directions and orders are the same and relative proportions of displacements at portions of the vibrating body in an axial direction are different, and
wherein a frequency range between a multiple of a maximum frequency of the driving signal and a multiple of a minimum frequency of the driving signal is configured to fall out of a resonance frequency in a mode where the non-sliding surface side of the vibrating body in the axial direction mainly vibrates with the third elastic body as a border.

11. The driving circuit of a vibration type driving apparatus according to claim 10,
wherein a frequency range between the multiple of the maximum frequency of the driving signal and the multiple of the minimum frequency of the driving signal is lower than the resonance frequency in the mode where the non-sliding surface side of the vibrating body mainly vibrates with the third elastic body as a border.

12. The driving circuit of a vibration type driving apparatus according to claim 10,
wherein a frequency range between the multiple of the maximum frequency of the driving signal and the multiple of the minimum frequency of the driving signal is higher than the resonance frequency in the mode where the non-sliding surface side of the vibrating body mainly vibrates with the third elastic body as a border.

* * * * *